ус007969875B2

(12) United States Patent
Lin

(10) Patent No.: US 7,969,875 B2
(45) Date of Patent: Jun. 28, 2011

(54) MEDIA GATEWAY AND PACKET FILTERING METHOD THEREOF

(75) Inventor: Yangbo Lin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 8 days.

(21) Appl. No.: 12/341,833

(22) Filed: Dec. 22, 2008

(65) Prior Publication Data

US 2009/0103551 A1   Apr. 23, 2009

Related U.S. Application Data

(63) Continuation of application No. PCT/CN2007/070193, filed on Jun. 27, 2007.

(30) Foreign Application Priority Data

Jun. 27, 2006   (CN) .......................... 2006 1 0094818

(51) Int. Cl.
*H04L 1/00* (2006.01)

(52) U.S. Cl. ......... 370/230; 370/235; 370/252; 370/392

(58) Field of Classification Search .................. 370/252, 370/389, 392, 395.31, 401
See application file for complete search history.

(56) References Cited

U.S. PATENT DOCUMENTS

| | | | | |
|---|---|---|---|---|
| 6,147,976 A * | 11/2000 | Shand et al. | ................ | 370/254 |
| 2005/0076108 A1* | 4/2005 | Li et al. | ..................... | 709/223 |
| 2006/0104284 A1 | 5/2006 | Chen | | |
| 2007/0153696 A1* | 7/2007 | Choyi et al. | .................. | 370/235 |
| 2008/0248879 A1* | 10/2008 | Smith | ............................. | 463/42 |
| 2008/0285471 A1* | 11/2008 | Tegeler | ........................ | 370/250 |

FOREIGN PATENT DOCUMENTS

| | | |
|---|---|---|
| CA | 2287824 A1 | 4/2000 |
| CN | 1622581 A | 6/2005 |
| EP | 0 909 075 A1 | 4/1999 |
| JP | 20066148532 A | 6/2006 |

OTHER PUBLICATIONS

Search Report issued in corresponding European Patent Application No. 07 72 1804; issued Jun. 12, 2009.
Office Action issued in corresponding Chinese Patent Application No. 200610094818X; issued Oct. 16, 2009.

(Continued)

*Primary Examiner* — Jayanti K Patel
*Assistant Examiner* — Bo Hui A. Zhu
(74) *Attorney, Agent, or Firm* — Brinks Hofer Gilson & Lione

(57) ABSTRACT

A media gateway (MG) and a packet filtering method thereof are provided to enhance the adaptability of the packet filtering mechanism on the MG. The packet filtering rule for a service instance may be changed dynamically, namely, the MG analyzes the currently transmitted packets of a service instance, obtains the state change of the instance, and then dynamically changes the packet filtering rule of the instance according to the state change of the instance. The present invention extends the property parameters of the H.248 protocol or MGCP protocol and adds a property parameter that indicates the dynamic packet filtering function is enabled or disabled and a property parameter that indicates the service type so that the MGC can enable or disable the packet filtering function for the instance of the specified service type flexibly according to the values of such parameters.

2 Claims, 3 Drawing Sheets

OTHER PUBLICATIONS

International Search Report issued in corresponding PCT Application PCT/CN2007/070193; mailed Aug. 30, 2007.

"Series H: Audiovisual and Multimedia Systems Infrastructure of Audiovisual Services—Communication Procedures—Gateway Protocol: Version 3" ITU-T Telecommunication Standardization Sector of ITU. Sep. 2005.

Written Opinion of the International Searching Authority issued in corresponding PCT Application No. PCT/CN2007/070193; mailed Aug. 30, 2007.

Office Action issued in corresponding European Patent Application No. 07 721 804.8; issued Jan. 20, 2011.

* cited by examiner

MEDIA GATEWAY AND PACKET FILTERING METHOD THEREOF

CROSS REFERENCES TO RELATED APPLICATIONS

This application is a continuation application of PCT/CN2007/070193, filed Jun. 27, 2007, which claims priority to the Chinese Patent Application No. 200610094818.X, filed with the Chinese Patent Office on Jun. 27, 2006 and entitled "Media Gateway and Packet Filtering Method Thereof", the contents of which are incorporated herein by reference in their entirety.

FIELD OF THE INVENTION

The present invention relates to the communication field, and in particular, to a packet filtering technology in a media gateway (MG).

BACKGROUND OF THE INVENTION

Among the news about the latest development of communication technologies, the next generation network (NGN) and 3rd generation (3G) are the most attractive.

During the evolution of the NGN, the definition of the NGN has continuously evolved. In the "Global NGN Summit 2004" organized by the International Telecommunication Union (ITU), the NGN is defined as a packet-based network that can provide various services such as telecom services and can use many types of broadband transmission technologies with quality of service (QoS) assurance. This definition specifies the ultimate direction and scope of the NGN.

The current NGN deployment generally adopts two key components, namely, the media gateway controller (MGC) and the media gateway (MG), for networking. The MGC is responsible for the call control function, and the MG is responsible for the service bearing function, thus separating the call control plane from the service bearer plane. The MGC and the MG may evolve independently. Thus, the network resources are fully shared, the equipment upgrade and service extension are simplified, and the costs of development and maintenance are greatly reduced.

The media gateway control protocol is a main protocol for communication between the MG and the MGC. The widely used protocols are H.284/Gateway Control Protocol (MeGaCo) and Media Gateway Control Protocol (MGCP). The protocol generally used for communication between MGs is the Real-time Transfer Protocol (RTP), as shown in FIG. 1.

The MGCP protocol was formulated by the Internet Engineering Task Force (IETF) in October 1999 and revised in January 2003. The H.284/MeGaCo protocol was formulated by the IETF and the ITU in November 2000 and revised in June 2003. The H.284/MeGaCo R2 protocol was formulated by the ITU in May 2002 and revised in March 2004. The H.284 R3 protocol was formulated by the ITU in September 2005.

For the H.248/MeGaCo protocol, eight basic commands are applicable between the MGC and the MG: Add, Modify, Subtract, Move, AuditValue, AuditCapabilities, Notify, and ServiceChange.

For the MGCP protocol, nine basic commands are applicable between the MGC and the MG: NotificationRequest (RQNT), Notify (NTFY), CreateConnection (CRCX), ModifyConnection (MDCX), DeleteConnection (DLCX), AuditEndpoint (AUEP), AuditConnection (AUCX), ReStartInProgress (RSIP), and EndpointConfiguration (EPCF).

The H.248/MeGaCo protocol derives from the MGCP. Taking the H.248 protocol as an example, the MG bears a service through the resources on the MG. Such resources are abstractly represented by terminations. Terminations are categorized into physical terminations and ephemeral terminations. Physical terminations are physical entities that exist semi-permanently, for example, time division multiplex (TDM) paths. Ephemeral terminations represent the public resources that are requested for an ephemeral purpose and released soon after being used, for example, RTP streams. The combinations between terminations are abstractly represented by contexts. Because a context may comprise multiple terminations, a topology is used to describe the interrelations between terminations. The termination not correlated with any other termination is contained by a special context called null context.

In such a protocol-based abstract model, a call connection is actually an operation on the termination and the context. Such operations are performed through the command request and reply mechanism between the MGC and the MG. Command parameters, also known as descriptors, are categorized into property, signal, event, and statistic categories.

Specifically, "Property" refers to the specifications of the resources, and is generally either sent by the MGC to the MG or set by the MG, for example, the maximum value and minimum value of jitter buffer. "Signal" is used by the MGC to instruct the MG to perform resource operations, for example, play a dialing tone, a ringback tone, or a busy tone to a user. "Event" is used by the MGC to instruct the MG to monitor the state, for example, monitor the user off-hook, hang-up, dialing, and flash-hook. "Statistic" indicates the state of resource utilization. Generally, the MG performs calculations, and the MGC may enable or disable (i.e., activate or deactivate) some of the parameters. The parameters with service relevance are logically aggregated into a package.

Under the control of the MGC, the MG is responsible for converting and transferring media streams between a user and a packet switched (PS) network and between PS networks in different domains. As shown in FIG. 2, an access media gateway (AMG) may perform media conversion and transfer between a plain old telephone service (POTS) user and an RTP media stream. A trunk media gateway (TMG) can perform media conversion and transfer between a time division multiplexing (TDM) trunk and an RTP media stream. A packet media gateway can perform media conversion and transfer between RTP media streams.

To ensure the quality of service (QoS) and communication security, the MGC needs to perform packet filtering for various media streams received and sent by the MG, namely, permit or prohibit the media streams with certain characteristics to enter or leave the MG. In the prior art, by sending certain filtering rules to the MG the MGC permits or prohibits the media streams that meet or do not meet the filtering rules to enter or leave the MG. Suppose the filtering rule sent by the current MGC to the MG is that only the TCP streams from port 21 can be received. Therefore when the MG receives a File Transfer Protocol (FTP) service packet, the MG judges whether it meets the filtering condition. If the FTP service packet comes from port 21, the FTP service packet meets the filtering rule, and the packet is permitted to enter or leave the MG If the FTP service packet comes other networks or ports, the packet is prohibited to enter or leave the MG.

In the practical application, the preceding solution has the following problem. The packet filtering method in the prior art may be unable to meet the requirements of certain services.

The main reason is as follows. In the prior art, each packet that enters or leaves the MG is filtered according to a fixed filtering rule. For certain services, however, the packets to be transferred for implementing a service are correlated, and the method in the prior art cannot filter these correlated packets correctly, thus failing to meet the requirements of the services. For example, in a practical application, the FTP service uses port 21 to transfer command packets, and uses a dynamically allocated port to transfer subsequent packets. In this case, if the MGC sets a simple rule that permits only the FTP service from port 21 to enter or leave the MG, it is impossible to meet the requirement for transferring the subsequent packets of the service. If the FTP services from port 21 and all other ports are permitted to enter or leave the MG to implement the FTP services, the packet filtering effect is lost.

SUMMARY OF THE INVENTION

An embodiment of the present invention provides an MG and a packet filtering method thereof so as to enhance the adaptability of the packet filtering mechanism on the MG.

In order to achieve the preceding objective, an embodiment of the present invention provides a packet filtering method in a MG The method comprises the following steps:

An MG analyzes the packets of a service instance that are permitted according to the current packet filtering rule to pass through the MG, and obtains the state change of the instance and adds, deletes, or changes the packet filtering rule for the packets of the instance according to the state change of the instance.

An embodiment of the present invention also provides an MG The MG comprises a filtering unit adapted to filter packets according to a packet filtering rule, an analyzing unit adapted to analyze the packets of a service instance that are permitted to pass through the MG according to the current packet filtering rule, obtain the state change of the instance, and report the changed state of the instance to a dynamic filtering rule setting unit, and a dynamic filtering rule setting unit adapted to add, delete or change the packet filtering rule used by the filtering unit to filter packets of the instance according to the state change of the instance.

The main difference between the technical solutions of the present invention and the prior art is that the packet filtering rule of the service instance is changed dynamically. In other words, the MG analyzes the packets that are being transmitted in a service instance, obtains the state change of the instance, and then changes the packet filtering rule applicable to the instance dynamically according to the state change of the instance. Therefore, the packet filtering rules are adaptive to the instance. Different packet filtering rules are applied to different instances of the same service in different scenarios, thus greatly enhancing the adaptability of the packet filtering mechanism of the MG By comparison, in the prior art, the packet filtering rule can only be set and used statically. Namely, once the packet filtering rules of the MG are set by the MGC, the rules do not change until the MGC sets new rules for the MG The MG is unable to adjust the packet filtering rules actively.

DETAILED DESCRIPTION OF THE INVENTION

For better understanding of the objective, technical solution and merits of the present invention, the present invention is hereinafter described in detail with reference to accompanying drawings and preferred embodiments.

The main merit of an embodiment of the present invention is as follows: the packet filtering rule for a service instance may be changed dynamically. In other words, the MG analyzes the packets that are being transmitted in a service instance, obtains the state change of the instance, and then changes the packet filtering rule applicable to the instance dynamically according to the state change of the instance. Therefore, the packet filtering rules are adaptive to the instance. Different packet filtering rules are applied to different instances of the same service in difference scenarios.

The following describes the packet filtering method in the first embodiment of the present invention.

Figure 1:
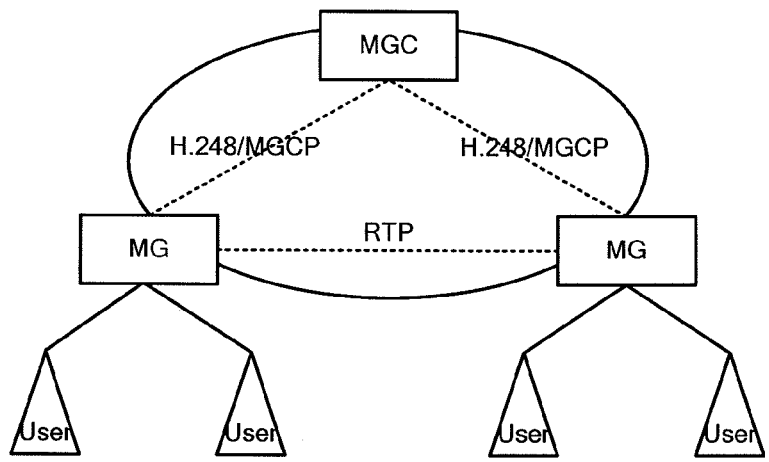
FIG. 1 shows the networking diagram of an MGC and an MG in the prior art.
Figure 2:
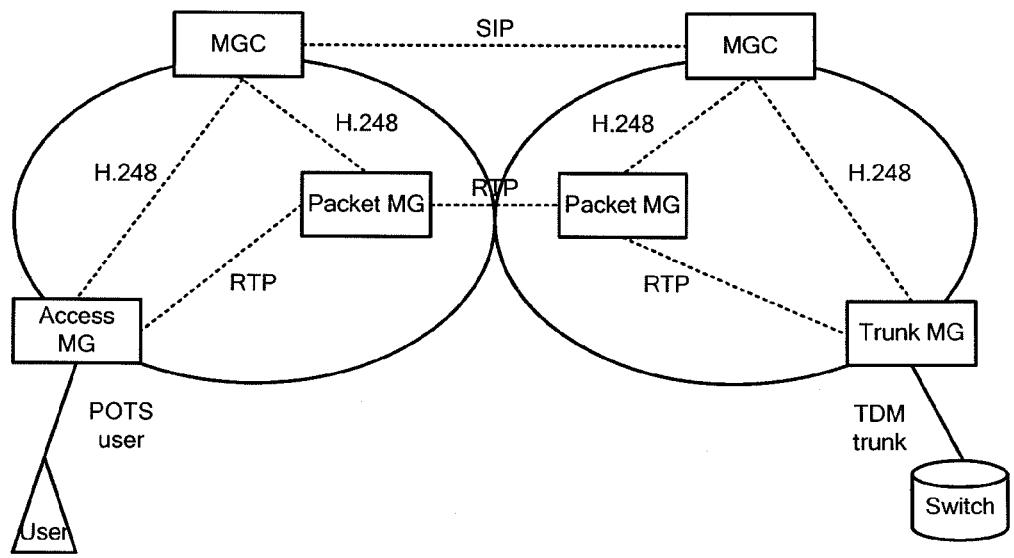
FIG. 2 shows the media conversion and transfer process of the MG under the control of the MGC in the prior art.
Figure 3:
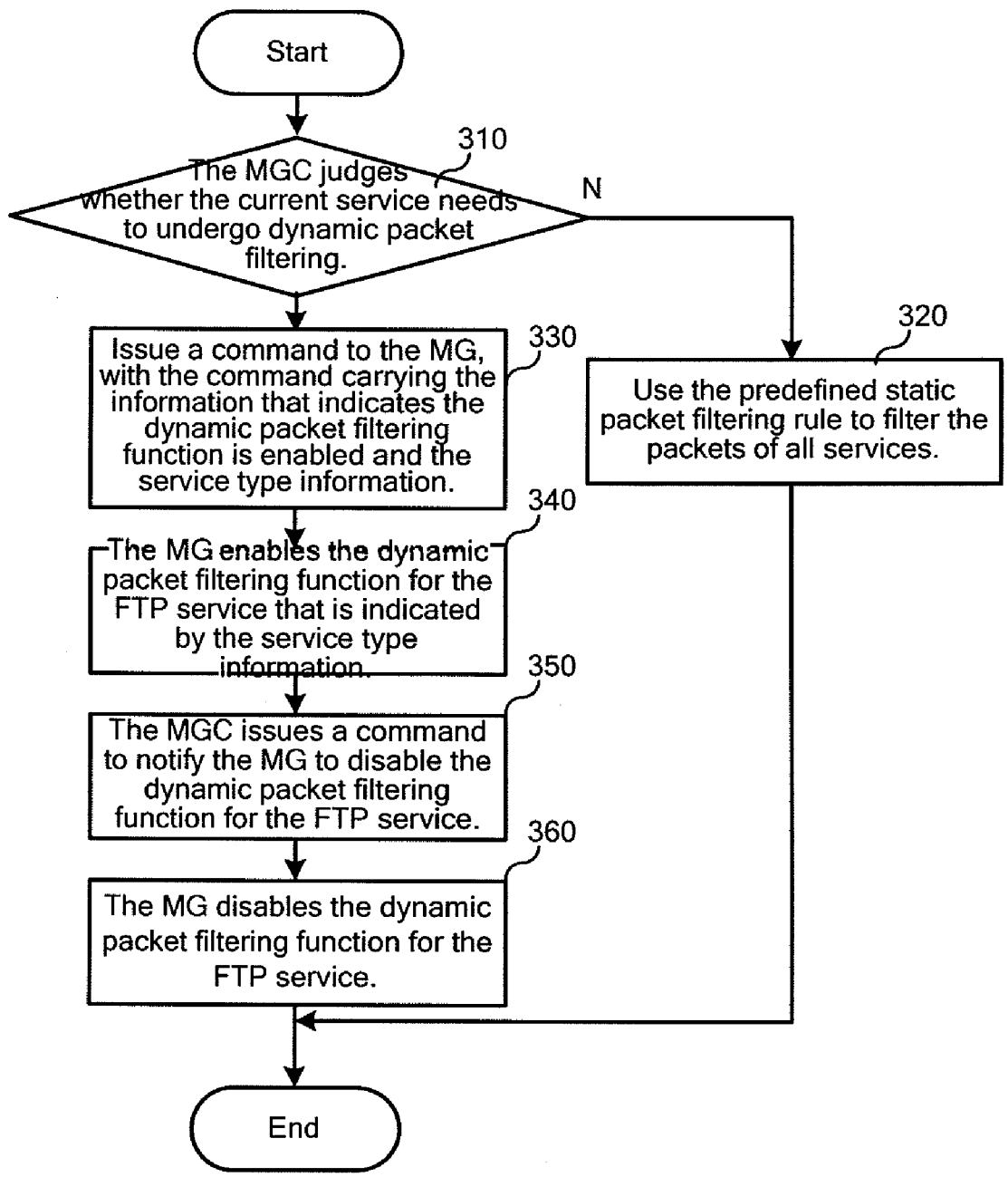
FIG. 3 is a flowchart of the packet filtering method in the first embodiment of the present invention.

As shown in FIG. 3, in step 310, the MGC judges whether the current service needs to undergo a dynamic packet filtering process according to the actual conditions, for example, the capability of the MG, termination subscription information, and/or local capabilities. Namely, the MGC judges whether it is necessary to dynamically change the packet filtering rule for the current service. If a service needs to undergo dynamic packet filtering, the packet filtering method skips to step 330. Otherwise the method proceeds to step 320 in which a predefined static packet filtering rule is applied to filter the packets of the services. The static filtering method is the same as that in the prior art, so it is omitted here.

In step 330, the MGC issues a command to the MG The command carries information that indicates the dynamic packet filtering function is enabled or disabled and the service type information.

Specifically, the information that indicates the dynamic packet filtering function is enabled or disabled and the service type information are extended property parameters in the H.248 or MGCP protocol. The information may be defined in an existing package or in a new package. If such information is defined in a new package, a new package must first be defined in the H.248 or MGCP protocol. In this embodiment, the new package is called Dynamic Packet Filtering (DPF) Package. Afterward, a property parameter that indicates the dynamic packet filtering function is enabled or disabled and the service type property parameter are defined in the package. The property parameter that indicates the dynamic packet filtering function is enabled or disabled is of the Boolean type, and the parameter value is "On" or "Off". The value "On" indicates that the dynamic packet filtering function is enabled, and the value "Off" indicates that the dynamic packet filtering function is disabled. The default value of this property parameter is "On". The service type property parameter is of the Enumeration type, and a value of the service type property parameter is negotiated between the MGC and the MG and may be "FTP" or "H.323". Different values represent different service types. By default, this property parameter represents all service types.

In step 330, the current FTP service needs to undergo a dynamic packet filtering process. Therefore, in the command issued by the MGC to the MG, the property parameter that indicates the dynamic packet filtering function is enabled or disabled is set to "On", and the service type property parameter is set to "FTP", indicating that the dynamic packet filtering function is enabled for the FTP service. Afterward, the method proceeds to step 340.

In step 340, after receiving the command from the MGC, the MG enables the dynamic packet filtering function according to the value "On" of property parameter that indicates the dynamic packet filtering function is enabled or disabled. The MG applies the dynamic packet filtering function to the FTP service according to the value (FTP) of the service type property parameter. If the command carries no service type property parameter, the MG applies the default value, namely, the MG applies the dynamic filtering function to all services.

In the subsequent step 350, when the MGC does not need to apply the dynamic filtering function to the FTP service, the MGC issues a command to the MG In the command, the property parameter that indicates the dynamic packet filtering function is enabled or disabled is set to "Off", and the service type property parameter is set to "FTP", instructing the MG to disable the dynamic packet filtering function for the FTP service. Therefore, through the additional property parameters that indicate the dynamic packet filtering function is enabled or disabled and the service type, the MGC can enable or disable the packet filtering function for the instance of the specified service type flexibly according to the values of such parameters.

In the subsequent step 360, after receiving the command from the MGC, the MG disables the dynamic packet filtering function for the FTP service because the property parameter that indicates the dynamic packet filtering function is enabled or disabled in the command is "Off", and the service type property value is "FTP". If the command carries no service type property parameter, the MG applies the default value, namely, the MG disables the dynamic filtering function for all services.

Therefore, this embodiment extends the property parameters of the H.248 or MGCP protocol and adds a property parameter that indicates the dynamic packet filtering function is enabled or disabled and a property parameter that indicates the service type so that the MGC can enable or disable the packet filtering function for the instance of the specified service type flexibly according to the values of such parameters.

The dynamic packet filtering process in this embodiment is: according to the state change of the FTP service instance, the MG adds, deletes, or changes the packet filtering rule of the instance in time and uses different packet filtering rules to filter the packets in different scenarios.

Figure 4:
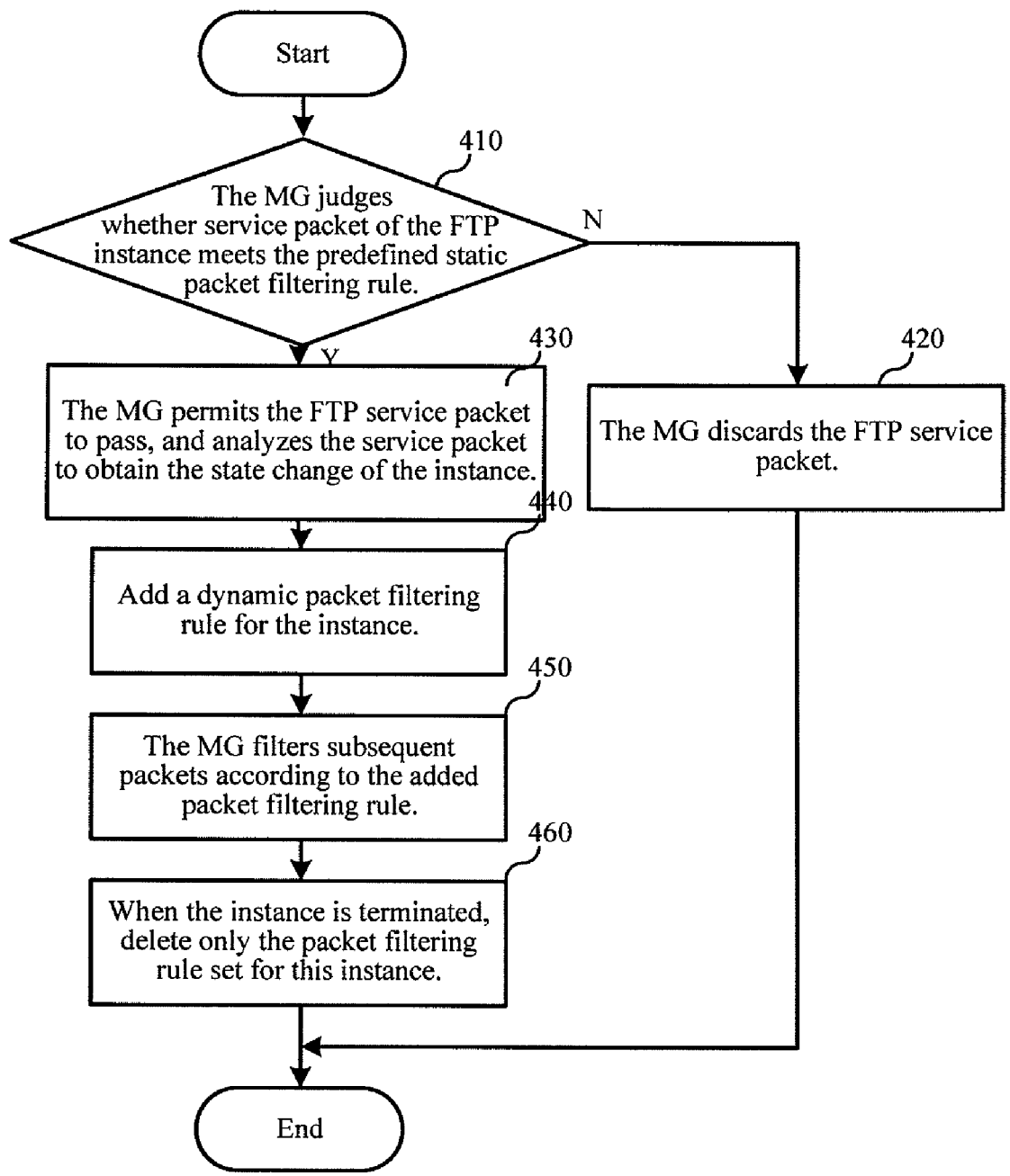
FIG. 4 is a flowchart of the dynamic filtering method in the packet filtering method in the first embodiment of the present invention.

Specifically, as shown in FIG. 4, suppose that a static packet filtering rule predefined for the FTP service is: permit the TCP streams that use port 21 to enter or leave the MG". In step 410, after receiving a service packet of the FTP instance, the MG judges whether the packet meets the predefined static packet filtering rule, namely, whether the FTP packet comes from port 21. If it comes from port 21, the method proceeds to step 430. Otherwise the method proceeds to step 420 in which the MG discards the FTP service packet.

In step 430, the MG permits the FTP service packet to pass and analyzes the service packet to obtain the state change of the instance. Specifically, the FTP instance sends a service packet through port 21 to negotiate with the peer, thus changing the state of the instance. Therefore, in step 430, the MG can obtain the state change of the instance by analyzing the service packet sent from port 21 (namely, the service packet used by the FTP instance to negotiate). If the FTP instance decides to use port 1000 to transmit the subsequent packets after negotiating with the peer, the MG can obtain the state change in time. For services other than the FTP service, the MG can also determine the state change of the instance by other means according to the prior art.

In the subsequent step 440, the MG adds a dynamic packet filtering rule for the instance: "permit the FTP service packet that uses port 1000 to enter or leave the MG" after determining the state change. Therefore, the packet filtering rules are adaptive to the instance. Different packet filtering rules are applied to different instances of the same FTP service in different scenarios, thus making the packet filtering mechanism of the MG much more adaptable to different services. This overcomes the weakness in the prior art, namely, once the packet filtering rules of the MG are set by the MGC, the rules do not change until the MGC sets new rules for the MG such that the rules are inadaptable to certain services.

In the subsequent step 450, the MG filters the service packets of the FTP instance according to the added packet filtering rule and permits the subsequent FTP packets of the instance from port 1000 to pass through the MG.

Through a quintuplet (namely, source address, destination address, source port, destination port, and protocol type) of the instance, the MG restricts other packets that pass through port 1000 and ensures that only the subsequent packets of the FTP instance can pass through the MG, thus ensuring security and reliability of filtering while implementing the dynamic filtering process.

In the subsequent step 460, the MG continues monitoring the state of the FTP instance. When detecting the instance is terminated, the MG deletes only the packet filtering rule set for this instance: "permit the FTP service packet that uses port 1000 to enter or leave the MG".

In the second embodiment of the present invention, the MG adds an analyzing unit, a dynamic filtering rule setting unit, and a command resolving module on the basis of the basic modules in the prior art. The analyzing unit is adapted to analyze the packets of a service instance that are permitted to pass through the MG according to the current packet filtering rule and obtain the state change of the instance. The dynamic filtering rule setting unit is adapted to add, delete, or change the packet filtering rule of the instance according to the state change of the instance. The command resolving module is adapted to resolve the command from the MGC and enable or disable the analyzing unit and the filtering rule setting unit according to the resolved contents.

Specifically, after receiving a command from the MGC, the MG resolves the command through the command resolving module. If the resolved command contains information that indicates the dynamic packet filtering function is enabled, the MG enables the analyzing unit and the dynamic filtering rule setting unit. The analyzing unit analyzes the packets of the service instance that are permitted to pass through the MG according to the current filtering rule and knows the state change of the instance. The dynamic filtering rule setting unit adds, deletes, or changes the packet filtering rule of the instance according to the state change of the instance. If the command contains information that indicates the dynamic packet filtering function is disabled, the MG disables the analyzing unit and the dynamic filtering rule setting unit. If the command contains service type information in addition to the information that indicates the dynamic packet filtering function is enabled or disabled, the MG instructs the analyzing unit and the dynamic filtering rule setting unit to restrict the operation objects only to the service type specified in the service type information. When the analyzing unit and the filtering rule setting unit are enabled, the packet filtering rules of the service instance can be changed dynamically. Namely, the MG obtains the state change of the instance by analyzing the packets that are being transmitted in the service instance and dynamically changes the packet filtering rules applicable to the instance according to the state change of the instance. Therefore, the packet filtering rules are adaptive to the instance. Different packet filtering rules are applied to different instances of the same service in different scenarios, thus greatly enhancing the adaptability of the packet filtering mechanism of the MG.

Although the invention has been described through some exemplary embodiments and accompanying drawings, the invention is not limited to such embodiments. It is apparent that those skilled in the art can make various modifications and variations to the invention without departing from the spirit and scope of the invention.

What is claimed is:

1. A method for packet filtering in a media gateway (MG) comprising:
    A. analyzing, by the MG, packets of a service instance that are permitted, according to current packet filtering rule, to pass through the MG; and
    obtaining the state change of the service instance; and
    adding, deleting or changing the packet filtering rule for the packets of the service instance according to the state change of the service instance; and
    filtering the packets according to the changed filtering rule;
    issuing, by a media gateway controller (MGC) a command to the MG, the command carrying information that indicates a dynamic packet filtering function is enabled or disabled;
    performing or terminating, by the MG, the step A. according to the information, wherein the command which the MGC issues to the MG further comprises service type information; and
    upon receiving the command, the MG performs the step A only for the service instance of a service type specified by the service type information carried in the command.

2. A media gateway (MG) comprising:
    a filtering unit adapted to filter packets according to a packet filtering rule; and
    an analyzing unit adapted to analyze the packets of a service instance that are permitted to pass through the MG according to current packet filtering rule, obtain the state change of the service instance, and report the changed state of the service instance to a dynamic filtering rule setting unit,
    wherein the dynamic filtering rule setting unit adapted to add, delete, or change the packet filtering rule used by the filtering unit to filter the packets of the service instance according to the state change of the service instance;
    a command resolving module adapted to resolve the command of a media gateway controller (MGC) the command of the MGC comprises information that indicates the dynamic packet filtering function is enabled, enable the analyzing unit and the dynamic filtering rule setting unit the command comprises information that indicates the dynamic packet filtering function is disabled, disable the analyzing unit and the dynamic filtering rule setting unit the command comprises service type information in addition to the information that indicates the dynamic packet filtering function is enabled or disabled, instruct the analyzing unit and the dynamic filtering rule setting unit to restrict the operation objects only to the service type specified in the service type information.

* * * * *

UNITED STATES PATENT AND TRADEMARK OFFICE
CERTIFICATE OF CORRECTION

PATENT NO. : 7,969,875 B2
APPLICATION NO. : 12/341833
DATED : June 28, 2011
INVENTOR(S) : Yangbo Lin It is certified that error appears in the above-identified patent and that said Letters Patent is hereby corrected as shown below:

In column 7, claim 1, line 26, after "permitted, according to" insert --a--.

In column 8, claim 2, line 13, before "current packet" insert --a--.

In column 8, claim 2, line 23, after "media gateway controller" replace "(MGC)" with --(MGC), if--.

In column 8, claim 2, line 27, before "the command comprises" replace "unit" with --unit, if--.

In column 8, claim 2, line 30, before "the command comprises" replace "unit" with --unit, if--.

Signed and Sealed this
Twenty-seventh Day of September, 2011

David J. Kappos
*Director of the United States Patent and Trademark Office*